United States Patent
Ohta

(10) Patent No.: US 9,762,877 B2
(45) Date of Patent: Sep. 12, 2017

(54) IMAGE PROCESSING APPARATUS AND IMAGE PROCESSING METHOD

(71) Applicant: OMRON Corporation, Kyoto (JP)

(72) Inventor: Takashi Ohta, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/930,410

(22) Filed: Nov. 2, 2015

(65) Prior Publication Data

US 2016/0269704 A1    Sep. 15, 2016

(30) Foreign Application Priority Data

Mar. 12, 2015   (JP) ................................ 2015-049714

(51) Int. Cl.
| | | |
|---|---|---|
| *H04N 9/73* | (2006.01) | |
| *G06T 7/90* | (2017.01) | |
| *H04N 1/62* | (2006.01) | |
| *H04N 9/64* | (2006.01) | |

(Continued)

(52) U.S. Cl.
CPC ........... *H04N 9/73* (2013.01); *G06K 9/00268* (2013.01); *G06T 7/90* (2017.01); *H04N 1/628* (2013.01); *H04N 9/045* (2013.01); *H04N 9/646* (2013.01); *G06K 9/00228* (2013.01); *G06T 2207/10016* (2013.01); *G06T 2207/10024* (2013.01); *G06T 2207/30201* (2013.01)

(58) Field of Classification Search
CPC . H04N 1/628; H04N 9/64–9/76; G06T 5/005; G06T 7/408; G06T 7/90; G06T 2207/10016; G06T 2207/10024; G06T 5/00; G06T 5/001; G06T 5/10–5/50

See application file for complete search history.

(56) References Cited

U.S. PATENT DOCUMENTS

| | | |
|---|---|---|
| 5,754,316 A | 5/1998 | Hayashi et al. |
| 8,406,482 B1 | 3/2013 | Chien et al. |

(Continued)

FOREIGN PATENT DOCUMENTS

| | | |
|---|---|---|
| JP | H09-18724 A | 1/1997 |
| JP | 2008-243059 A | 10/2008 |
| KR | 20060041685 A | 5/2006 |

OTHER PUBLICATIONS

Notice of Preliminary Rejection issued in corresponding Korean Application No. 10-2015-0143340, mailed on Jun. 13, 2016 (8 pages).

(Continued)

*Primary Examiner* — Paul Berardesca
(74) *Attorney, Agent, or Firm* — Osha Liang LLP

(57) ABSTRACT

An image processing apparatus comprises an image acquiring unit configured to acquire an image; a representative-color acquiring unit configured to acquire a representative color, which is a color representing a target region where the correction is performed, from the acquired image; and an image correcting unit configured to perform correction processing on the image on the basis of a set reference color, wherein the image correcting unit updates the reference color with the representative color when similarity between the representative color corresponding to the processing target image and the reference color is equal to or smaller than a predetermined threshold, and does not update the reference color when the similarity is larger than the predetermined threshold.

7 Claims, 6 Drawing Sheets

(51) Int. Cl.
*H04N 9/04* (2006.01)
*G06K 9/00* (2006.01)

(56) References Cited

U.S. PATENT DOCUMENTS

2005/0185839 A1 8/2005 Matsubara
2007/0274573 A1 11/2007 Hori

OTHER PUBLICATIONS

Extended European Search Report in counterpart European Application No. 15 19 1284.7 issued Jul. 25, 2016 (11 pages).

IMAGE PROCESSING APPARATUS AND IMAGE PROCESSING METHOD

CROSS-REFERENCE TO RELATED APPLICATION

This application is based on Japanese Patent Application No. 2015-049714 filed with the Japan Patent Office on Mar. 12, 2015, the entire contents of which are incorporated herein by reference.

BACKGROUND OF THE INVENTION

Field of the Invention

The present invention relates to an image processing technique for correcting a moving image including a face of a person as an object.

Description of the Related Art

In recent years, a technique for automatically correcting an image including a face of a person (a face image) photographed using a digital camera or the like is becoming more common. As an example of such a technique, there is skin texture correction. The skin texture correction is correction for applying filtering to an image to gloss skin and remove a wrinkle. With the skin texture correction, it is possible to improve appearance of the face included in the image.

As a technique for applying the skin texture correction to an image, for example, there is an image processing apparatus described in Japanese Patent Application Laid-Open No. 2008-243059. The image processing apparatus extracts pixels having a hue of a skin color from a face image and determines, on the basis of the hue, a region for which correction should be performed.

SUMMARY OF THE INVENTION

When it is desired to correct pixels having a specific color (e.g., a skin color if a correction target is skin or red if the correction target is a lip) included in a face image, it is generally known that, like the apparatus described in Japanese Patent Application Laid-Open No. 2008-243059, a color representing a color of the correction target (hereinafter representative color) is determined and a correction target region is generated on the basis of the representative color.

Incidentally, there is a demand for performing image processing such as the skin texture correction in a moving image as well. For example, the same effect of improving the skin texture can be obtained by applying the technique to frames of a moving image photographed by a digital video camera.

However, when a correction target is a moving image, even when the direction of a face and a way of irradiation of illumination do not greatly change, a representative color sometimes slightly fluctuates for each of the frames. This is caused by, for example, slight movement of a person, who is an object, and compression noise of the moving image. When the representative color fluctuates, a range of the correction and the intensity of the correction fluctuate. Therefore, if the frames after the correction are continuously reproduced, a phenomenon occurs in which the correction range is seen floating or seen flickering. That is, even if the technique is directly applied to the frames of the moving image, a natural correction result cannot be obtained.

The present invention has been devised in view of the above problems and it is an object of the present invention to provide a technique for obtaining a more natural correction result in an image processing apparatus that applies correction to a plurality of continuous images forming a moving image.

An image processing apparatus according to the present invention is an apparatus that sequentially applies correction to a plurality of continuous images forming a moving image.

Especially, the image processing apparatus comprises an image acquiring unit configured to acquire an image; a representative-color acquiring unit configured to acquire a representative color, which is a color representing a target region where the correction is performed, from the acquired image; and an image correcting unit configured to perform correction processing on the image on the basis of a set reference color, wherein the image correcting unit updates the reference color with the representative color when similarity between the representative color corresponding to the processing target image and the reference color is equal to or smaller than a predetermined threshold, and does not update the reference color when the similarity is larger than the predetermined threshold.

The image processing apparatus according to the present invention specifies, from an acquired image, a target region for which correction is performed and acquires a representative color, which is a color representing the target region. The target region is, for example, a region corresponding to skin of a person or a region corresponding to a lip or the like of the person but is not limited to these regions. However, the target region is desirably a region having a specific color.

The image correcting unit is a unit that performs correction processing on an image on the basis of a set reference color. The reference color is a color retained while the apparatus is applying the correction processing to a plurality of images. The reference color is updated when a predetermined condition is satisfied. Specifically, when similarity between a representative color corresponding to a processing target image and the retained reference color is equal to or smaller than a predetermined value, the reference color is updated with the representative color. When the similarity between the representative color corresponding to the processing target image and the reference color is larger than the predetermined value, the reference color is retained without being updated.

That is, the reference color is updated at timing when a shift among representative colors increase to a certain degree while a plurality of images are processed.

With such a configuration, even when the representative color varies for each of frames, it is possible to absorb the variation. Therefore, it is possible to suppress unnecessary fluctuation in a correction range and correction intensity. It is possible to suppress artificiality in reproducing a corrected moving image.

For each pixel included in the acquired image, the image correcting unit may calculate a value representing similarity of a color to the reference color, generate, on the basis of a distribution of the values, a correction map representing a distribution of weights used in performing the correction on the image, and perform the correction processing using the correction map.

The correction map is a map representing intensity of correction performed for the acquired image. Specifically, the correction map is a map defined to apply more intense correction to a pixel having larger similarity of a color to the reference color. Consequently, for example, in order to perform skin texture correction, it is possible to apply more intense correction to a region having a more intense component of a skin color.

The image correcting unit may perform correction processing for adding a blur to the acquired image and determine intensity of the blur using the correction map.

The present invention can be suitably applied to, in particular, an image processing apparatus that applies smoothing to a region having a specific color by adding a blur to the region. Consequently, it is possible to remove fine noise from a target region and improve appearance of an object.

For each of the pixels included in the acquired image, the image correcting unit may calculate a value representing intensity of an edge and generate the correction map further on the basis of a distribution of the values.

When it is desired to perform correction for smoothing noise (e.g., a wrinkle or irregularities on skin) by adding a blur to an image, if the correction is applied to a region where an intense edge is present, the edge is blurred and an unnatural image is obtained. Therefore, after intensity of the edge is acquired, a correction map for applying weak correction to a region where the intensity of the edge is intense may be generated.

A target of the correction may be skin of a person. The present invention can be suitably applied to, in particular, an image processing apparatus that performs image correction for making the skin of the person look smooth.

Note that the present invention can be specified as an image processing apparatus including at least a part of the units. The present invention can also be specified as an image processing method performed by the image processing apparatus. The present invention can also be specified as a computer program for causing a computer to execute the image processing method. The processing and the units can be freely combined and implemented as long as technical contradiction does not occur.

According to the present invention, it is possible to obtain a more natural correction result in an image processing apparatus that applies correction to a plurality of continuous images forming a moving image.

DESCRIPTION OF THE EMBODIMENTS

A preferred embodiment of the present invention is explained below with reference to the drawings.

Figure 1:
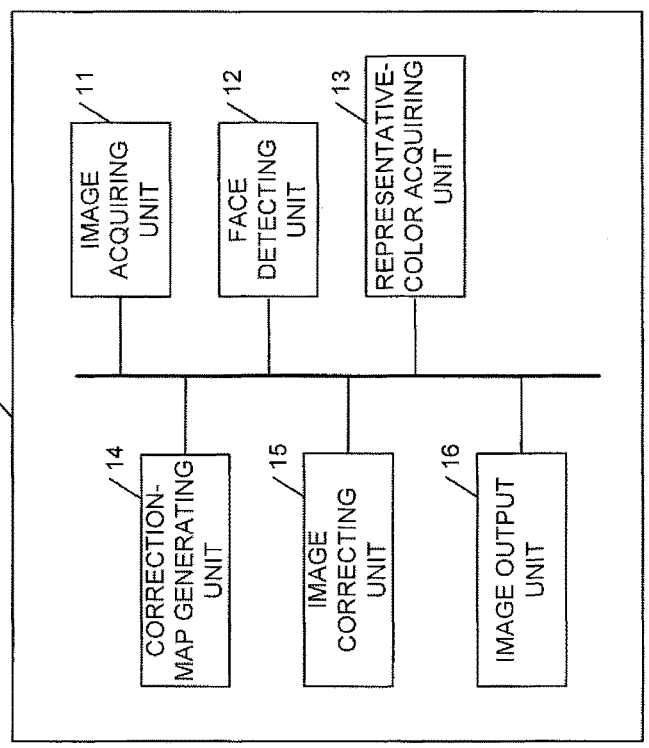
FIG. 1 is a system configuration diagram of an image processing apparatus according to an embodiment.

An image processing apparatus according to this embodiment is an apparatus that acquires a moving image including the figure of a person and applies a filter to a plurality of images included in the moving image to perform correction for making skin look smooth (hereinafter, skin texture correction). FIG. 1 is a diagram showing a system configuration diagram of an image processing apparatus 10 according to this embodiment.

The image processing apparatus 10 according to the embodiment includes an image acquiring unit 11, a face detecting unit 12, a representative-color acquiring unit 13, a correction-map generating unit 14, an image correcting unit 15, and an image output unit 16.

The image acquiring unit 11 is a unit that acquires a processing target image (hereinafter, input image). Specifically, the image acquiring unit 11 acquires input images corresponding to frames from a moving image file stored in a storage device such as a fixed disk drive or a flash memory.

Note that the image acquiring unit 11 may acquire the input images from sources other than the moving image file stored in the storage device. For example, the image acquiring unit 11 may acquire the input images via an interface device or a radio communication device or may acquire the input images via a lens and an image pickup element. In both the cases, a plurality of images that are continuously reproduced or should be continuously reproduced only have to be able to be acquired.

The face detecting unit 12 is a unit that extracts a region corresponding to a face of a person from the input images acquired by the image acquiring unit 11. Specifically, the face detecting unit 12 detects feature points corresponding to a face of a person from the input images and specifies, on the basis of a detection result, a region where the face is present (hereinafter, face region).

The representative-color acquiring unit 13 is a unit that acquires a color representing a correction target region (hereinafter, representative color) included in the input images. The image processing apparatus according to this embodiment is an apparatus that applies correction to a region corresponding to skin (hereinafter, skin region). Therefore, the representative color is a skin color.

Specifically, the representative-color acquiring unit 13 samples a plurality of images present in the skin region and calculates a single representative color on the basis of a sampling result. A specific processing method is explained below.

The correction-map generating unit 14 is a unit that generates a correction map on the basis of the face region extracted by the face detecting unit 12 and the representative color acquired by the representative-color acquiring unit 13. The correction map is a map representing a weight in correcting the input images and is a map that gives a larger weight to a place where a color should be more greatly corrected. A specific processing method is explained below.

The image correcting unit 15 is a unit that performs correction on the input images using the correction map generated by the correction-map generating unit 14. The correction is performed by applying a filter for adding a blur to the input images (a smoothing filter). When the image correcting unit 15 performs the correction, it is possible to obtain an image in which the skin region is smoothed. The image after the correction is transmitted to the image output unit 16.

The image output unit 16 is a unit that reconverts a plurality of images corrected by the image correcting unit into a moving image and outputs the moving image. For example, the image output unit 16 may store the moving image in a not-shown storing unit or may provide a user with the moving image through a liquid crystal display or the like. The image output unit 16 may transmit the moving image to other apparatuses and computers through an interface.

Note that the units explained above may be realized by exclusively designed hardware or may be realized by software modules. The units may be realized by a field programmable gate array (FPGA), an application specific integrated circuit (ASIC), or the like or may be realized by a combination of these.

When the units are configured as software, a computer program stored in an auxiliary storage device is loaded to a main storage device and executed by a CPU, whereby the units function. (None of the CPU, the auxiliary storage device, and the main storage device is shown in the figure.)

A unit that executes the computer program is not limited to the CPU and may be an image signal processor (ISP), a digital signal processor (DSP), a graphics processing unit (GPU), or the like.

Figure 2:
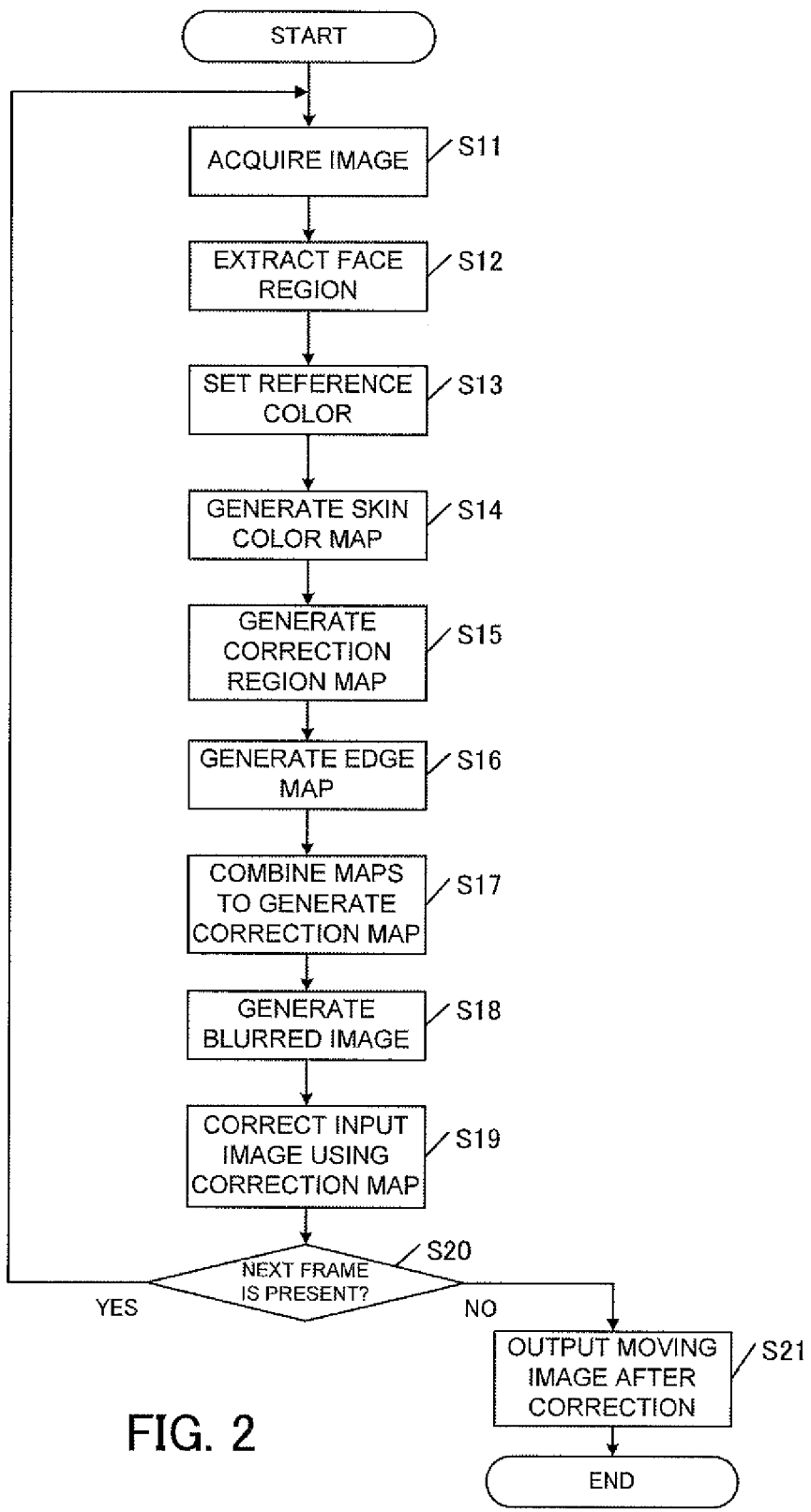
FIG. 2 is a flowchart of processing performed by the image processing apparatus.

Processing for applying correction to a skin region included in acquired input images is explained in order with reference to FIG. 2, which is a flowchart of processing performed by the image processing apparatus 10. The processing shown in FIG. 2 is started on the basis of an instruction from the user of the apparatus.

Figure 3:
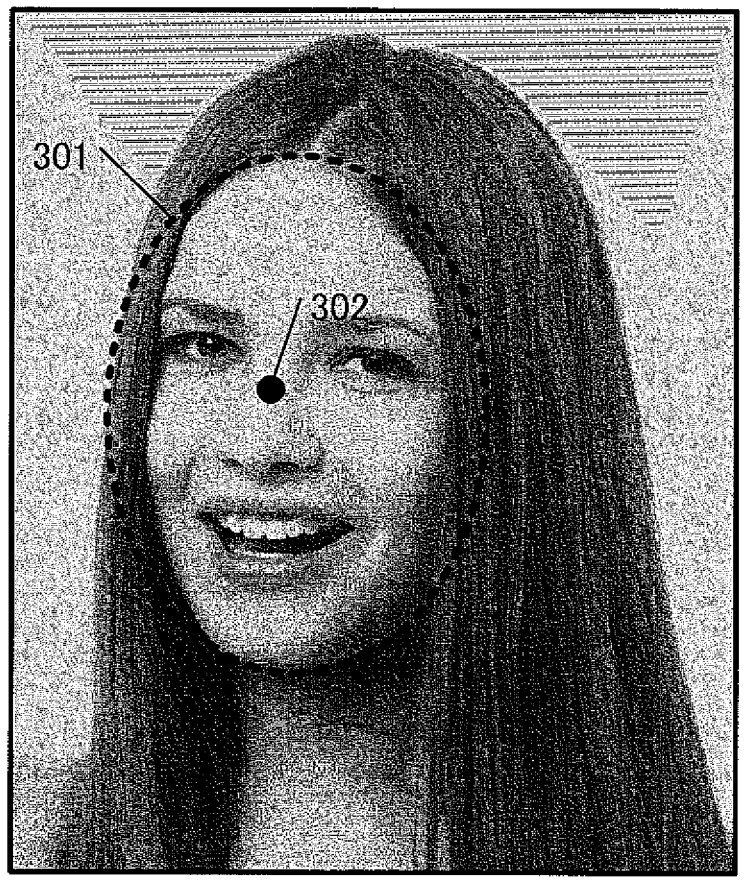
FIG. 3 is an example of an input image and a face region.

First, the image acquiring unit 11 acquires an image (step S11). In this embodiment, it is assumed that the image acquiring unit 11 acquires, from a storage device, a moving image file stored in advance and acquires images frame by frame from the top. However, the image acquiring unit 11 may acquire images with other methods. For example, the image acquiring unit 11 may acquire images via a communication unit or an image pickup unit. In all the cases, the image acquiring unit 11 only has to acquire one image among a plurality of images to be continuously reproduced. FIG. 3 is an example of the acquired image.

Subsequently, the face detecting unit 12 detects feature points from the acquired input image to extract a region corresponding to a face (a face region) (step S12). Since a method of extracting a face region from an image on the basis of feature points is publicly known. Therefore, detailed explanation of the method is omitted. Note that, when failing in the detection of the feature points, the face detecting unit 12 may detect the position of the face through matching processing. In this embodiment, an ellipse indicated by reference numeral 301 represents the face region.

Figure 4:
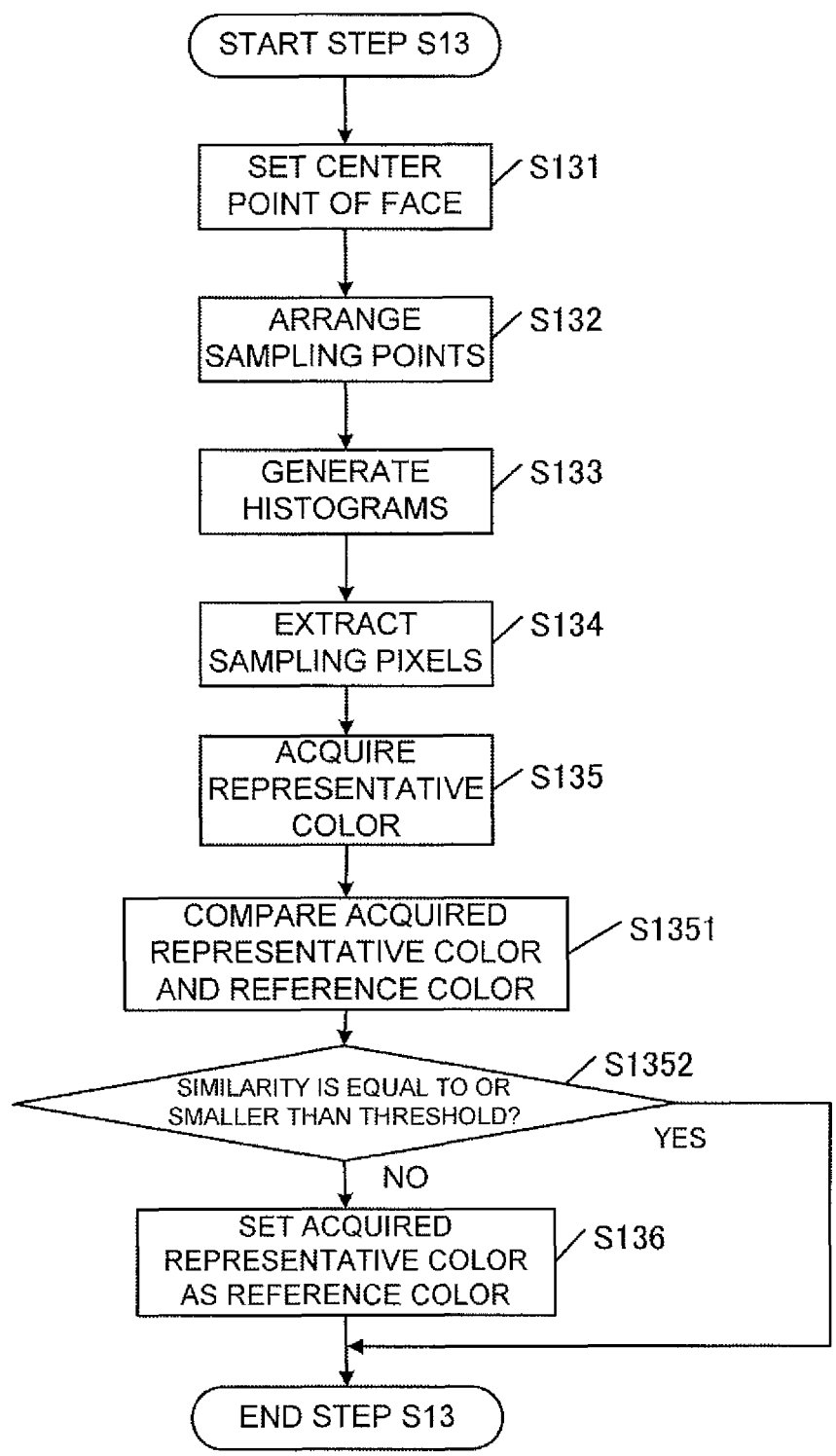
FIG. 4 is a flowchart for explaining, in detail, processing for acquiring a representative color.

Subsequently, the representative-color acquiring unit acquires a color representing a skin color (a representative color) included in the input image and sets the color as a reference color (step S13). FIG. 4 is a flowchart for explaining, in detail, content of the processing performed in step S13.

First, the representative-color acquiring unit 13 sets a center point of the face in the face region (step S131). The center point of the face can be set, for example, at the tip of the nose or near the nose. However, the center point is desirably set in a place less easily affected by a make-up and illumination. In the example shown in FIG. 3, reference numeral 302 denotes the center point of the face.

Subsequently, the representative-color acquiring unit 13 arranges points for performing sampling of pixels (hereinafter, sampling points) in the vicinity of the detected center point (step S132). For example, the representative-color acquiring unit 13 arranges 256 sampling points in a region of 16×16 pixels centering on the center point acquired in step S131. Note that the sampling points are arranged to overlap pixels.

Subsequently, the representative-color acquiring unit generates, for the respective pixels on which the sampling points are arranged, histograms of hues (step S133). For example, when the hues are represented by three values, three histograms are generated.

Subsequently, the representative-color acquiring unit calculates averages $\mu$ for the generated histograms, extracts only pixels in which all of the values representing the hues belong to a predetermined range centering on the averages, and sets the pixels as sampling pixels (step S134). For example, when a standard deviation is represented as $\sigma$ and the predetermined range is represented as $\pm 2\sigma$, only sampling pixels in which all of the hues are present in the range of $\pm 2\sigma$ centering on the averages are extracted.

Subsequently, in step S135, the representative-color acquiring unit 13 determines a representative color of skin using the extracted sampling pixels. The representative color can be determined using, for example, the averages of the colors of the sampling pixels. However, the representative color may be determined using other methods.

Note that, in this example, the sampling pixels are arranged near the center of the face. However, the representative color may be determined using other methods. For example, it is also possible to extract, from all the pixels included in the image, pixels having hues in a predetermined range (skin color-based colors), acquire an average of the colors of the pixels, and set the average as the representative color.

Processing shown in steps S1351 to S1352 is processing necessary in second and subsequent loops. Therefore, the processing is explained below.

Subsequently, the representative-color acquiring unit 13 sets the representative color acquired in step S135 as a reference color. The reference color is retained by the representative-color acquiring unit 13 until the correction processing ends.

Subsequently, the correction-map generating unit 14 generates a skin color map (step S14). The skin color map is a map having a size same as the size of the input image and is a map representing similarity of hues between the pixels included in the input image and the reference color. That is, the skin color map can be considered a map representing the intensity of a skin color of the pixels included in the input image. Note that the similarity of hues may be obtained by, for example, normalizing a distance on a color space into a predetermined range. In this step, similarities to the reference color are calculated for all the pixels included in the input image to generate the skin color map.

Note that, in this embodiment, a value of the skin color map is 256 gradations. The value is 255 when the hues are the same and is 0 when a difference among the hues is the maximum. However, the value may be weighted separately. For example, correction for setting the value larger as the hue of the target pixel is closer to the skin color may be performed.

Subsequently, the correction-map generating unit 14 generates a correction region map (step S15).

The skin color map is only a map generated on the basis of a color. Therefore, when correction is performed using only the skin color map, a large weight is sometimes allocated to a region not corresponding to skin (e.g., skin-color clothes). Therefore, in this embodiment, a correction region map, which is a map weighted on the basis of a positional relation with the face, is further generated and used in addition to the skin color map.

Figure 5:
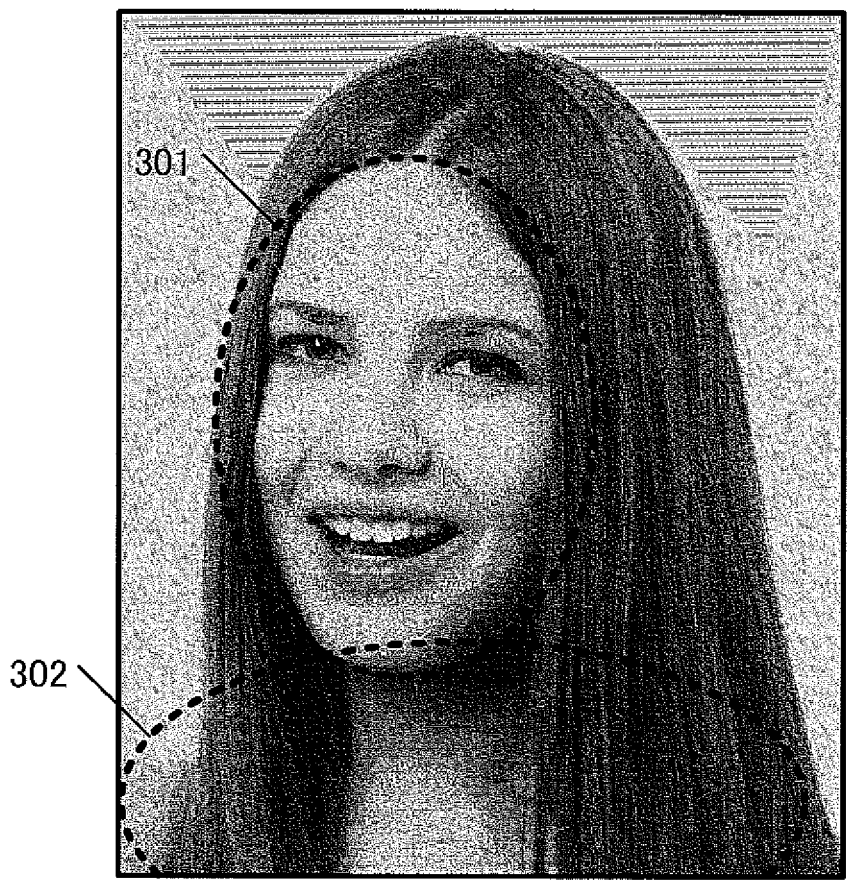
FIG. 5 is a diagram for explaining a correction region map.

A region weighted by the correction region map is, for example, a region corresponding to the face (a face region) and a region corresponding to the neck or the chest. FIG. 5 is a diagram for explaining a region weighted by the correction region map. In this example, a face region 301 and a region 302 corresponding to the neck and the chest are weighted. However, the weighted region may be other regions where skin is presumed to be present.

Subsequently, the correction-map generating unit 14 generates an edge map (step S16). The edge map is a map representing an edge of the input image.

Since the skin texture correction is a correction for applying a blur, if pixels corresponding to the edge are corrected, an image becomes unclear. Therefore, in this embodiment, the edge map is generated to exclude the pixels corresponding to the edge and perform the correction.

In step S16, the correction-map generating unit 14 applies filters for respectively extracting edges in the longitudinal direction and the lateral direction to the input image. As the filters, for example, a Sobel filter applied to the longitudinal and lateral two directions can be suitably used. The correction-map generating unit 14 applies emphasis processing and smoothing processing to an output result to obtain the edge map.

Subsequently, the correction-map generating unit 14 integrates the skin color map, the correction region map, and the edge map to generate a single map used in correcting the input image (step S17).

First, the correction-map generating unit 14 combines the skin color map and the correction region map and combines the edge map with an obtained result. The combination is performed by adding up values respectively allocated to the three maps and dividing the sum by 3. As a result, a map for applying more intense correction to pixels having a color closer to the skin color, closer to the correction region, and further away from the edges is generated. The generated map is referred to as correction map.

Subsequently, the image correcting unit 15 applies a filter to the input image to generate an image subjected to correction for smoothing the skin (step S18). The image generated in this step is an image uniformly applied with the filter irrespective of the presence of the skin. In this step, for example, the correction-map generating unit 14 generates an image obtained by applying a Gaussian filter to the input image in the longitudinal and lateral directions. Note that, although the Gaussian filter is used as an example of the filter, other filters may be used as long as the image can be smoothed, that is, blurred. A filter other than the filter for blurring may also be used. The image generated in this step is referred to as blurred image.

Subsequently, the image correcting unit 15 corrects the input image using the correction map (step S19).

Specifically, the image correcting unit 15 combines the input image acquired in step S11 and the blurred image generated in step S18 using the correction map generated in step S17 and outputs a combined image. The combination is performed such that a mixing ratio of the blurred image is higher as the value defined in the correction map is larger. For example, when the value defined in the correction map is 255, the image correcting unit 15 combines the input image and the blurred image at a ratio of 0:100. When the value defined in the correction map is 0, the image correcting unit 15 combines the input image and the blurred image at a ratio of 100:0.

According to the processing explained above, the correction processing is applied to the image corresponding to one frame of the moving image. The image after the correction is transmitted to the image output unit 16 and temporarily stored.

The image correcting unit 15 determines whether processing target frames remain (step S20). When the processing target frames remain, the processing shifts to step S11, and processing is performed on an image of the next frame.

The above explanation is explanation of processing performed when the processing target frame is the first frame (i.e., the first loop). Processing performed when the processing target is second and subsequent frames (i.e., second and subsequent loops) is explained from step S1351.

In step S1351, the representative-color acquiring unit 13 compares the set reference color (i.e., the representative color acquired in the preceding loop) and the representative color acquired in step S135 and calculates similarity of the reference color and the representative color.

Similarity of colors can be determined on the basis of, for example, a distance in a color space. For example, when an input image is represented by three components, a value obtained by adding up absolute values of differences among the components (sum of absolute differences) may be used or a value obtained by adding up square of the differences among the components (sum of squared differences) may be used. Other methods may be used.

If the calculated similarity is equal to or smaller a threshold (Yes in step S1352), the update of the reference color is not performed and the processing in step S14 is performed.

On the other hand, if the similarity is larger than the threshold (No in step S1352), the reference color is updated with the representative color acquired in step S135.

Note that the same processing is performed in third and subsequent loops. That is, the reference color used for the correction is sometimes the representative color acquired when an image preceding by more than two frames is processed.

Figure 6:
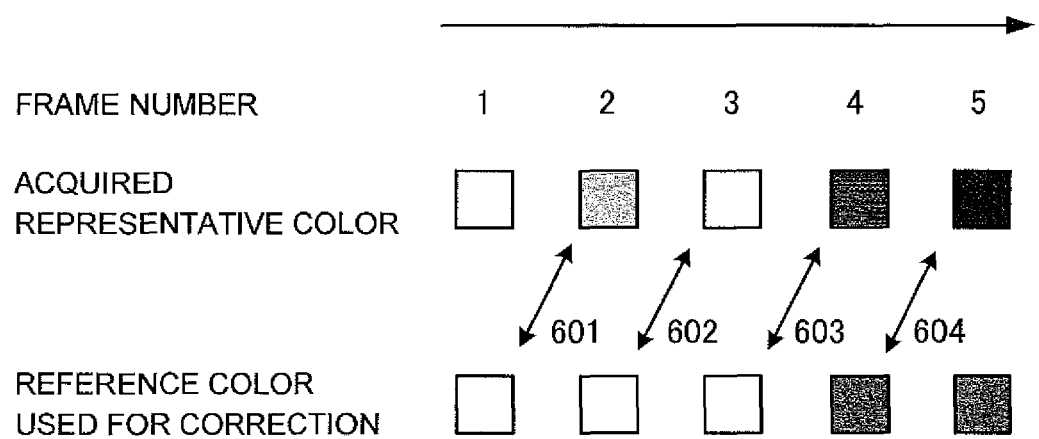
FIG. 6 is a diagram illustrating a relation between the representative color and a reference color.

FIG. 6 is a diagram illustrating, in time series, a change in the representative color and a change in the reference color used for the correction. In the case of this example, the representative color is acquired in a frame 1. However, in frames 2 and 3, since an amount of change of the representative color is equal to or smaller than a threshold (reference numerals 601 and 602), the reference color does not change. On the other hand, in a frame 4, since the amount of change of the representative color is larger than the threshold (reference sign 603), the reference color is updated. In a frame 5, since the amount of change of the representative color is equal to or smaller than the threshold (reference sign 604), the reference color is not updated.

As explained above, the image processing apparatus according to the embodiment performs the correction on the image using the already acquired representative color unless the amount of change of the representative color is larger than the threshold. Consequently, it is possible to suppress fluctuation in the representative color due to a slight change of a condition. It is possible to suppress artificiality caused because a region where the correction is performed and the intensity of the correction fluctuate for each of the frames.

Note that the threshold in the determination in step S1352 only has to be a value with which it can be determined that a way of irradiation of illumination and the direction of the face clearly change and more natural correction can be performed when a new representative color is set. Such a value may be manually set by the user of the apparatus or may be automatically calculated by the apparatus on the basis of a correction result in the past.

Modifications

The embodiments explained above are only examples. The present invention can be changed and carried out as appropriate without departing from the spirit of the present invention.

For example, the intensity of the correction may be able to be adjusted by further multiplying the generated correction map with a correction coefficient. For example, the user of the apparatus may be able to designate the correction coefficient before the processing shown in FIG. 2 is started.

The threshold used in step S1352 may be a fixed value and may be a value that changes according to a state of an object. For example, processing may be performed to set the threshold larger when the object is present in an environment in which floating and flickering in a correction range are conspicuous and set the threshold smaller when the object is present in an environment in which floating and flickering in the correction range are less conspicuous. The processing in step S1352 may be temporarily disabled by setting the threshold to 0.

In the explanation of the embodiments, the image processing apparatus that applies the processing to the image stored in the storage device is explained as the example. However, the image does not always have to be acquired from the storage device and, for example, may be acquired from the outside of the apparatus via a wired or wireless network.

The present invention may be carried out as an image pickup apparatus having a function of correcting a picked-up moving image by combining an image pickup unit that picks up a moving image and the image processing apparatus.

What is claimed is:

1. An image processing apparatus that sequentially applies correction to a plurality of continuous images forming a moving image, the image processing apparatus comprising:
    an image acquiring unit configured to acquire an image;
    a representative-color acquiring unit configured to acquire a representative color, which is a color representing a target region where the correction is performed, from the acquired image; and
    an image correcting unit configured to perform correction processing on the image on the basis of a set reference color,
    wherein the image correcting unit performs the correction processing on the image corresponding to an $n^{th}$ frame, based on the reference color set when correcting the image corresponding to an $m^{th}$ frame (m<n), and
    wherein the image correcting unit updates the reference color with the representative color when similarity between the representative color corresponding to the image and the reference color is equal to or smaller than a predetermined threshold, and does not update the reference color when the similarity is larger than the predetermined threshold.

2. The image processing apparatus according to claim 1, wherein, for each pixel included in the acquired image, the image correcting unit calculates a value representing similarity of a color to the reference color, generates, on the basis of a distribution of the values, a correction map representing a distribution of weights used in performing the correction on the image, and performs the correction processing using the correction map.

3. The image processing apparatus according to claim 2, wherein the image correcting unit performs correction processing for adding a blur to the acquired image and determines intensity of the blur using the correction map.

4. The image processing apparatus according to claim 3, wherein, for each of the pixels included in the acquired image, the image correcting unit calculates a value representing intensity of an edge and generates the correction map further on the basis of a distribution of the values.

5. The image processing apparatus according to claim 3, wherein a target of the correction is skin of a person.

6. An image processing method performed by an image processing apparatus that sequentially applies correction to a plurality of continuous images forming a moving image, the image processing method comprising:
    an image acquiring step of acquiring an image;
    a representative-color acquiring step of acquiring a representative color, which is a color representing a target region where the correction is performed, from the acquired image; and
    an image correcting step of performing correction processing on the image on the basis of a set reference color,
    wherein in the image correcting step, the correction processing is performed on the image corresponding to an $n^{th}$ frame, based on the reference color set when correcting the image corresponding to an $m^{th}$ frame (m<n), and
    wherein in the image correcting step, the reference color is updated with the representative color when similarity between the representative color corresponding to the image and the reference color is equal to or smaller than a predetermined threshold, and the reference color is not updated when the similarity is larger than the predetermined threshold.

7. A non-transitory computer readable storing medium recording a computer program for causing a computer to execute each of the steps of the image processing method according to claim 6.

* * * * *